(12) United States Patent
Yasuda et al.

(10) Patent No.: US 8,058,963 B2
(45) Date of Patent: Nov. 15, 2011

(54) COIL COMPONENT AND POWER-SUPPLY DEVICE PROVIDED THEREWITH

(75) Inventors: Katsuharu Yasuda, Tokyo (JP);
Kiyofumi Fujiwara, Tokyo (JP);
Masatoshi Shindo, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/688,285

(22) Filed: Jan. 15, 2010

(65) Prior Publication Data

US 2010/0176909 A1    Jul. 15, 2010

(30) Foreign Application Priority Data

Jul. 17, 2008   (JP) .................. 2008-185591

(51) Int. Cl.
*H01F 27/28* (2006.01)
*H01F 27/02* (2006.01)
*H01F 17/06* (2006.01)
*H01F 27/24* (2006.01)

(52) U.S. Cl. .......... 336/223; 336/83; 336/178; 336/212; 336/233

(58) Field of Classification Search .................. 336/233, 336/83, 178, 221, 222, 223
See application file for complete search history.

(56) References Cited

U.S. PATENT DOCUMENTS 7,352,269 B2 * 4/2008 Li et al. .......................... 336/170
2008/0303624 A1 * 12/2008 Yamada et al. ............... 336/212

FOREIGN PATENT DOCUMENTS

JP  2007-184509  7/2007

OTHER PUBLICATIONS

English translation of JP2007-184509.*

* cited by examiner

*Primary Examiner* — Anh Mai
*Assistant Examiner* — Ronald Hinson
(74) *Attorney, Agent, or Firm* — McDermott Will & Emery LLP (57) ABSTRACT

The coil component includes a magnetic core 130 and conductors 210 and 220. The magnetic core 130 includes through-holes that are made by grooves 111 and 112. The conductors 210 and 220 are provided in the grooves 111 and 112, respectively. The magnetic core 130 includes a nonmagnetic portion in which the grooves 111 and 112 are communicated, and a distance between the conductors 210 and 220 through the nonmagnetic portion is shorter than a distance between the conductors 210 and 220 in surfaces 110c and 110d in which the conductors 210 and 220 are exposed. Therefore, necessity to provide a large cavity in the magnetic core is eliminated, and a risk of the short circuit between terminal electrodes exposed in the surfaces 110c and 110d is also eliminated.

15 Claims, 12 Drawing Sheets

COIL COMPONENT AND POWER-SUPPLY DEVICE PROVIDED THEREWITH

BACKGROUND OF THE INVENTION

1. Field of the Invention

The present invention relates to a coil component, particularly to a coil component that is suitably used as a coupled inductor of a power-supply device. The invention also relates to a power-supply device provided with the coil component.

2. Description of Related Art

A so-called multi-phase regulator circuit is known as one of power-supply devices used in a computer and the like. In the multi-phase regulator circuit, switching currents having different phases are produced by switching, and a smooth output current is obtained by combining the switching currents. In the multi-phase regulator circuit, a coil component called a coupled inductor may be used in order to smooth output current. For example, Japanese Patent Application Laid-Open No. 2007-184509 discloses a coupled inductor.

Figure 12A:
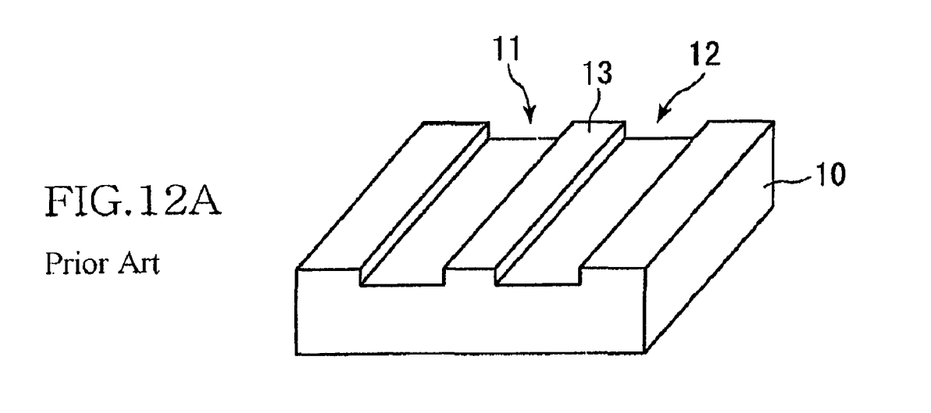
FIG. 12A illustrates an example in which grooves 11 and 12 are separated by a partition wall 13.

In order to smooth output current by the coupled inductor, it is necessary that a magnetic coupling be generated at a desired level between a pair of conductors through which the switching currents are passed. That is, the smooth output current cannot be obtained, when the excessively strong magnetic coupling is generated between the conductors, or when the excessively weak magnetic coupling is generated between the conductors. Therefore, it is necessary to adjust the magnetic coupling to an optimum level. The magnetic coupling level can be adjusted by changing a thickness or a shape of a magnetic body existing between the conductors. Specifically, as illustrated in FIG. 12A, grooves 11 and 12 in which the conductors (not illustrated) are disposed are formed in a magnetic core 10, and the grooves 11 and 12 are completely separated by a partition wall 13 that is a part of the magnetic core 10, thereby reducing the magnetic coupling between the conductors. On the other hand, as illustrated in FIG. 12B, when the grooves 11 and 12 are integrated by removing the partition wall 13, the magnetic coupling between the conductors is increased.

Figure 12B:
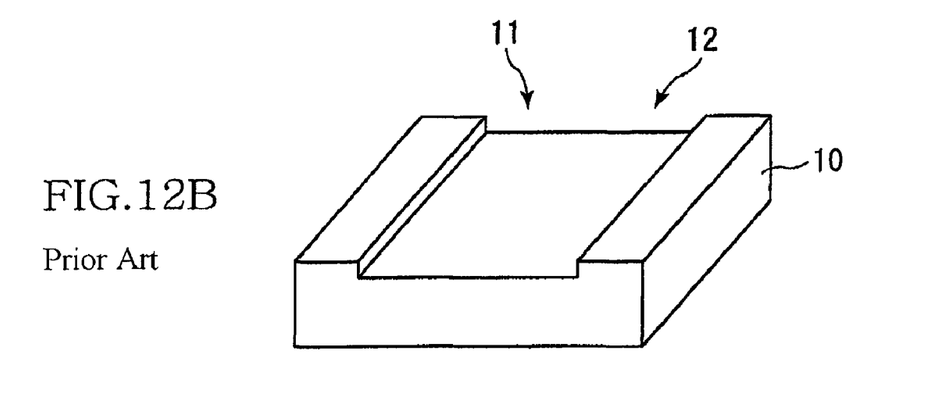
FIG. 12B illustrates an example in which grooves 11 and 12 are integrated.
Figure 12C:
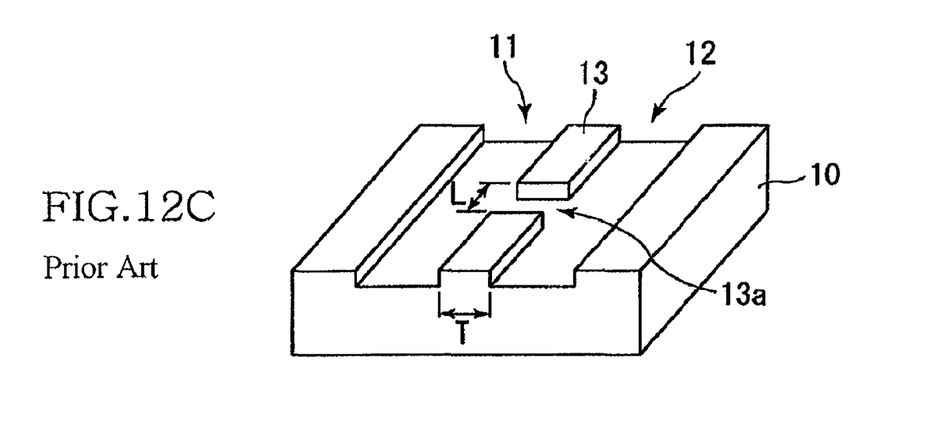
FIG. 12C illustrates an example in which a cavity 13a is provided in the partition wall 13.

However, when the target magnetic coupling level is larger than the level obtained by the structure of FIG. 12A and smaller than the level obtained by the structure of FIG. 12B, the magnetic coupling is hardly adjusted by the presence or absence of the partition wall 13. As illustrated in FIG. 12C, the grooves 11 and 12 may be partially connected through a cavity 13a by removing a part of the partition wall 13. In this case, an intermediate level between the magnetic coupling level obtained by the structure of FIG. 12A and the magnetic coupling level obtained by the structure of FIG. 12B can be obtained. Accordingly, it is believed that a desired magnetic coupling can be obtained by adjusting a length L of the cavity 13a.

However, according to the research of the inventors, it is proved that various problems occur when the magnetic coupling is adjusted only by the length L of the cavity 13a. Specifically, when the length L of the cavity 13a is increased to enhance the magnetic coupling, a volume of the cavity 13a is increased with the length. That is, the large cavity exists in the magnetic core 10. On the other hand, because a predetermined volume (core volume) is required for the magnetic core 10, external dimensions of the magnetic core 10 are to be enlarged when the large cavity exists in the magnetic core 10.

In order to enhance the magnetic coupling without enlarging the external dimensions of the magnetic core 10, a distance (a thickness T of the partition wall 13) between the grooves 11 and 12 may be shorten. However, a distance between the conductors is also shortened when the distance between the grooves 11 and 12 is shortened, which increases a risk of a short circuit failure between terminal electrodes. Such problems are not significant in the coupled inductor in which the coated lead wire is installed in the groove like the coupled inductor disclosed in Japanese Patent Application Laid-Open No. 2007-184509. On the other hand, such problems become significant in the coupled inductor in which the end portions of the conductors disposed in the grooves 11 and 12 are used as the terminal electrode like a surface-mounted coupled inductor.

The problems occur in not only the coupled inductor but also the overall coil component.

SUMMARY

An object of the invention is to provide a coil component, in which the enlargement of the external dimensions of the magnetic core is suppressed and the desired magnetic coupling can be obtained while the short circuit failure between conductors is prevented, and a power-supply device provided with the coil component.

In one embodiment of the present invention, there is provided a coil component includes a magnetic core that has at least first and second through-holes, the first and second through-holes piercing through the magnetic core from one of surfaces to the other surface; and first and second conductors that are disposed in the first and second through-holes, respectively, wherein the magnetic core includes a nonmagnetic portion that communicates the first through-hole and the second through-hole inside the magnetic core, and a distance between the first conductor and the second conductor through the nonmagnetic portion is shorter than a distance between the first conductor and the second conductor in the one and the other surfaces.

Therefore, in the coil component of the embodiment, the distance between the first conductor and the second conductor is shortened in the nonmagnetic portion, so that the magnetic coupling between the conductors can be enhanced without providing the large cavity in the magnetic core. Further, because the distance between the first conductor and the second conductor is lengthened in the surface of the magnetic core, a risk of the short circuit between the terminal electrodes is not increased even if the terminal electrodes are provided in the surface of the magnetic core.

In the coil component, preferably a length of the first and second through-holes from one of the surfaces to the nonmagnetic portion is equal to a length of the first and second through-holes from the other surface to the nonmagnetic portion. Accordingly, because the nonmagnetic portion is located in the central portion of the magnetic core, the same characteristic is obtained even if an input side and an output side are reversed. That is, because the coil component has no directional property, work efficiency can be enhanced when the coil component is mounted.

The nonmagnetic portion may be a cavity. Accordingly, the production cost of the magnetic core can be suppressed. The nonmagnetic portion may be an insulating member buried in the magnetic core. Accordingly, the short circuit failure through the nonmagnetic portion can be prevented.

In the coil component, preferably the first and second conductors are exposed while bent in the surfaces of the magnetic core. Accordingly, the coil component can be used as the surface-mounted coil component. In this case of the coil component, preferably sectional surfaces of the first and second through-holes and sectional surfaces of the first and second conductors are formed into quadrangular shapes in which a side parallel to a mounting surface is longer than a side perpendicular to the mounting surface. Accordingly, an unnecessary gap is hardly generated in the magnetic core, the conductor is easily bended, and a low profile of the coil component is advantageously achieved.

In another embodiment, there is provided a power-supply device includes first and second switching units that produce first and second switching currents having different phases, respectively; and the coil component described above, wherein first and second switching currents are supplied to the first and second conductor, respectively. Accordingly, the compact, high-reliability power-supply device can be provided by using the coil component.

As described above, the invention can provide a coil component, in which the enlargement of the external dimensions of the magnetic core is suppressed and the desired magnetic coupling can be obtained while the short circuit failure between conductors is prevented, and a power-supply device provided with the coil component.

BRIEF DESCRIPTION OF DRAWINGS

The above features and advantages of the present invention will be more apparent from the following description of certain preferred embodiments taken in conjunction with the accompanying drawings, in which:

FIGS. 8A to 8C show current waveform charts illustrating an operation of the power-supply device 400, where

FIGS. 12A to 12C illustrate a shape of a magnetic core 10 used in a conventional coil component, where

DETAILED DESCRIPTION OF THE INVENTION

Preferred embodiments of the present invention will be explained below in detail with reference to the accompanying drawings.

Figure 1:
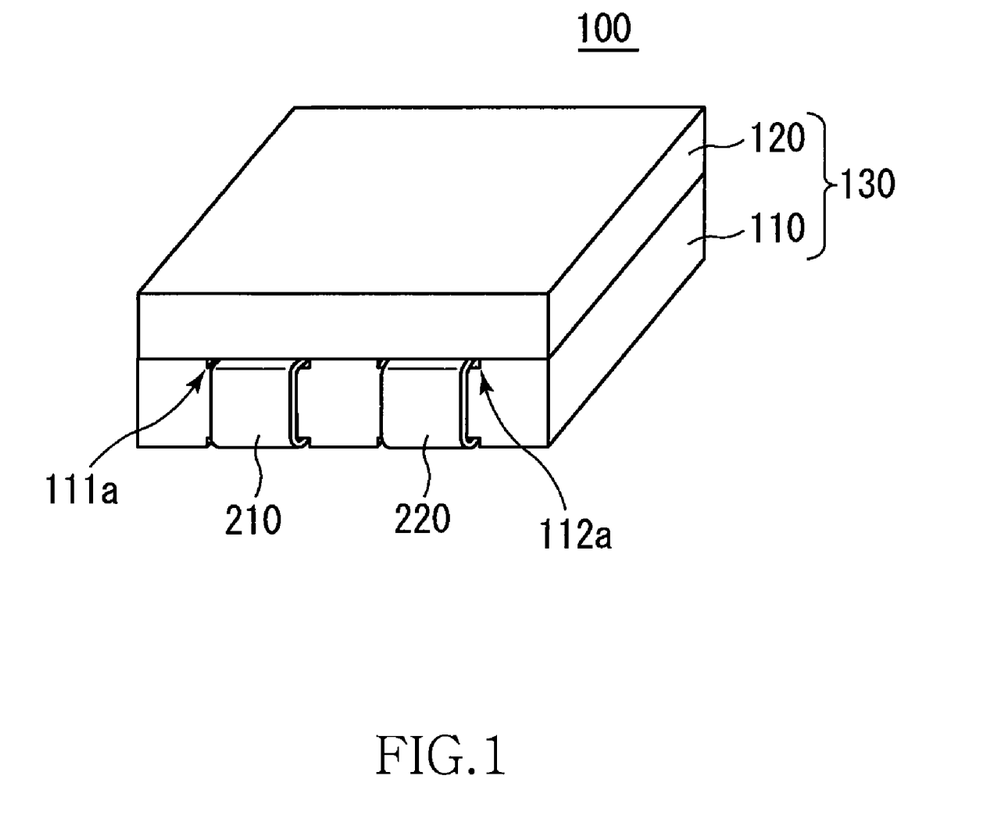
FIG. 1 is a schematic perspective view illustrating an appearance of a coil component 100 according to an exemplary embodiment of the invention.
Figure 2:
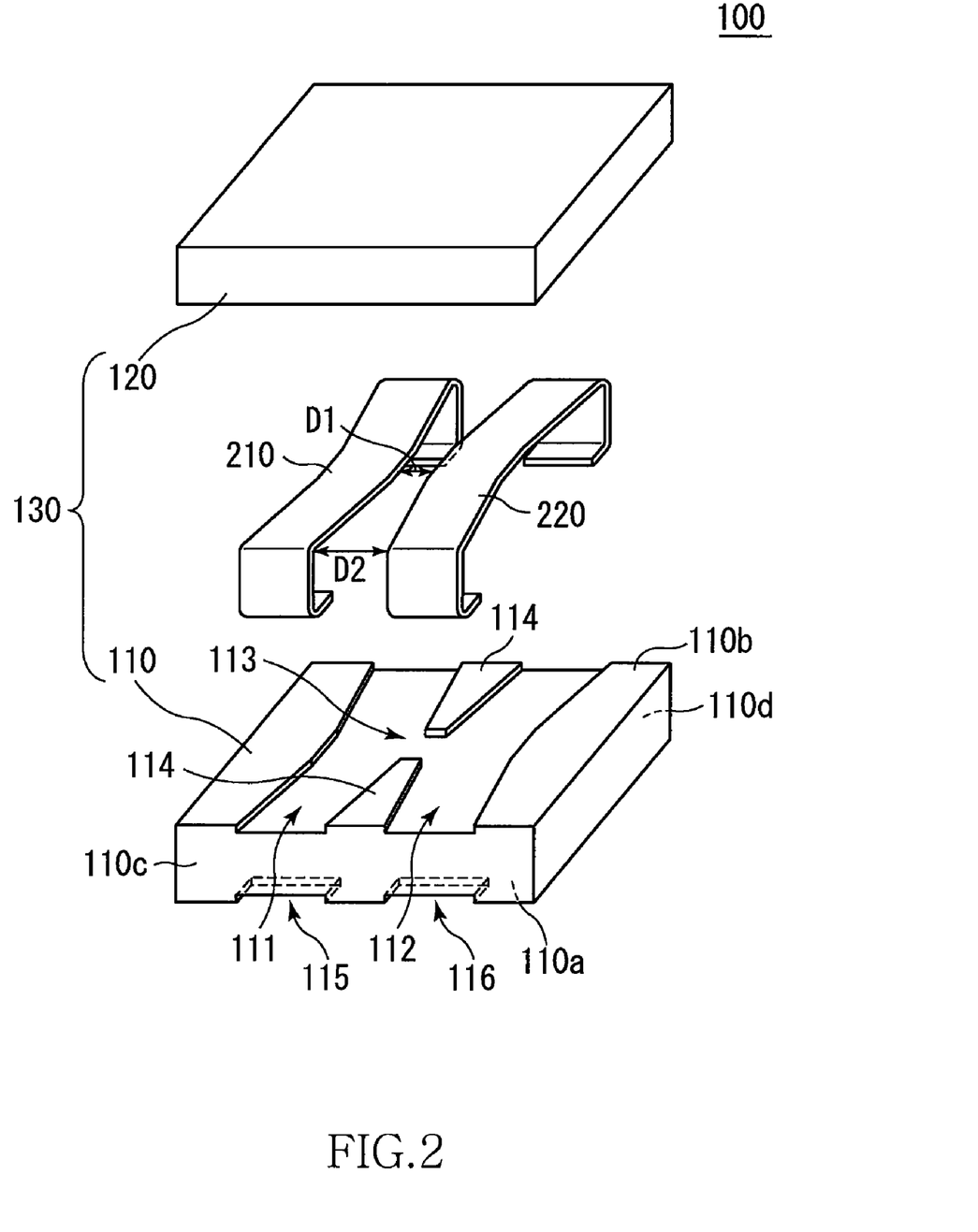
FIG. 2 is a schematic exploded perspective view of the coil component 100.

FIG. 1 is a schematic perspective view illustrating an appearance of a coil component 100 according to an exemplary embodiment of the invention. FIG. 2 is a schematic exploded perspective view of the coil component 100 of the embodiment.

As illustrated in FIGS. 1 and 2, the coil component 100 of the embodiment includes a magnetic core 130 and first and second conductors 210 and 220. The magnetic core 130 includes first and second magnetic members 110 and 120. Preferably the magnetic members 110 and 120 are made of a Mn—Zn ferrite or a Ni—Zn ferrite. Preferably the conductors 210 and 220 are made of metal such as copper. A high magnetic coupling can be obtained when the magnetic members 110 and 120 are made of the Mn—Zn ferrite. However, because the Mn—Zn ferrite has electrically conductive characteristic, it is necessary to coat the conductors 210 and 220 with an insulating material.

Figure 3:
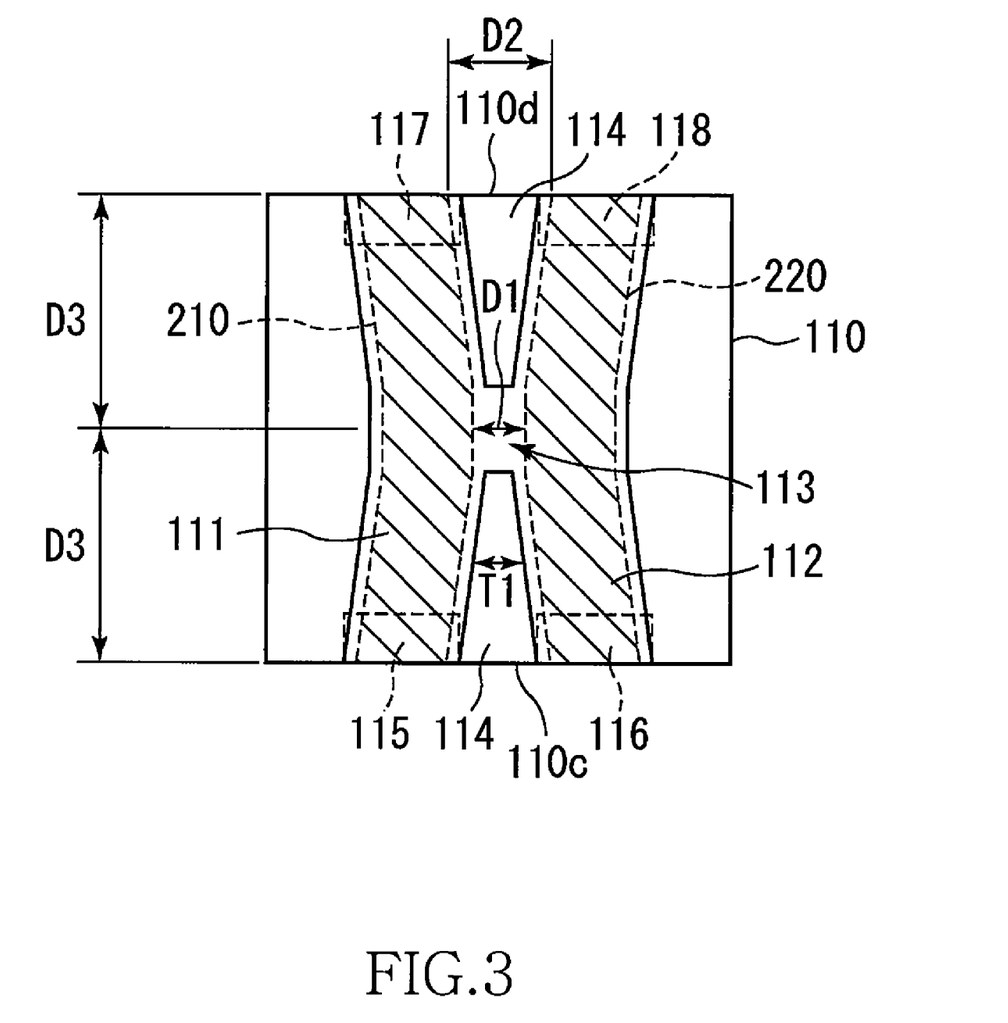
FIG. 3 is a schematic plan view of a magnetic member 110 viewed from a side of a surface 110b.
Figure 4:
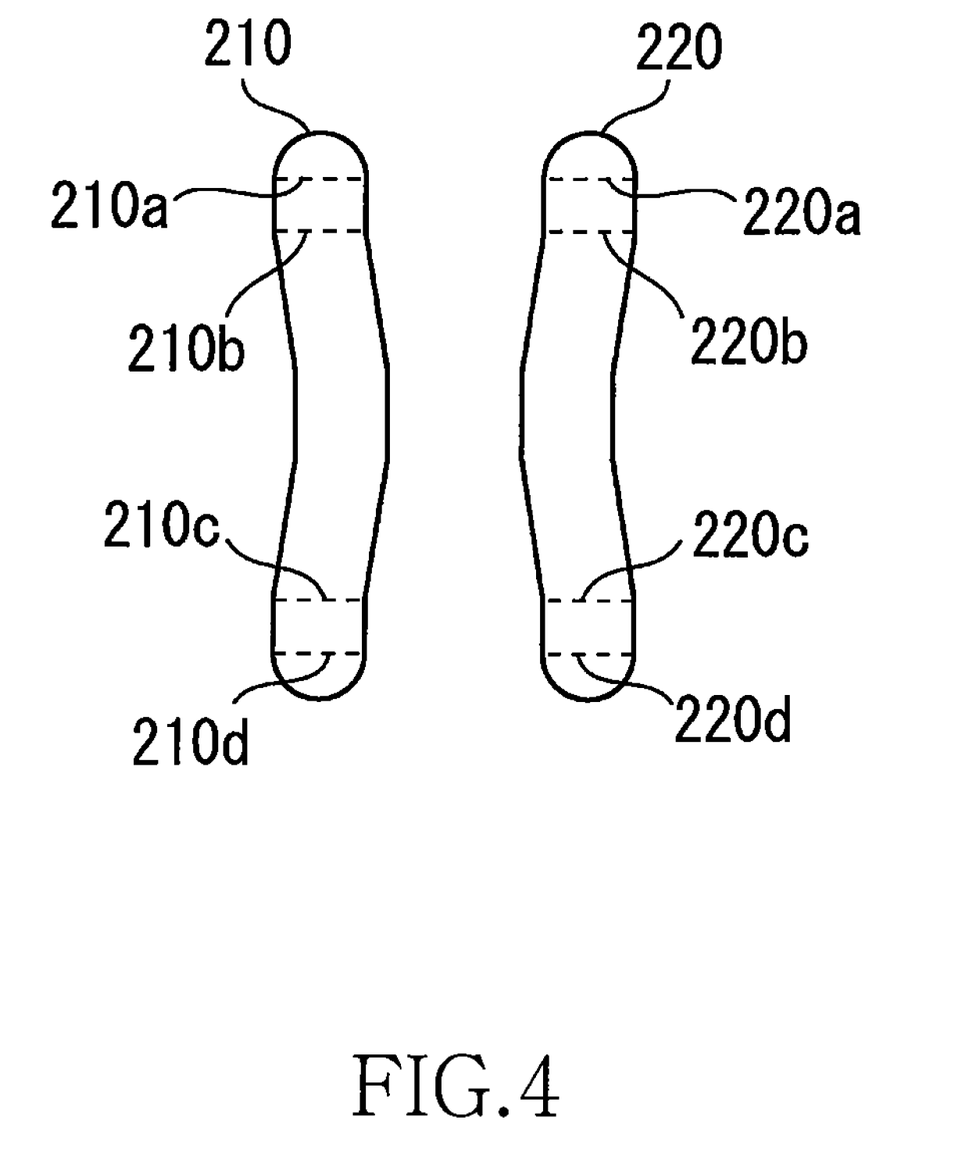
FIG. 4 is a plan view of conductors 210 and 220.

The magnetic member 110 is formed into a planar plate shape, and includes a mounting surface 110a that is a bottom surface, a surface 110b that is parallel to the mounting surface 110a, and surfaces 110c and 110d that are perpendicular to the mounting surface 110a. The magnetic member 120 is also formed into a planar plate shape, and bonded to the surface 110b of the magnetic member 110. FIG. 3 illustrates a structure when the magnetic member 110 is viewed from the side of the surface 110b. FIG. 3 also illustrates planar positions of the conductors 210 and 220. FIG. 4 is a plan view of the conductors 210 and 220.

As illustrated in FIGS. 2 and 3, two grooves 111 and 112 are formed in the surface 110b of the magnetic member 110. The grooves 111 and 112 accommodate the conductors 210 and 220 therein, respectively. Therefore, when the magnetic members 110 and 120 are bonded while the conductors 210 and 220 are accommodated in the grooves 111 and 112, the grooves 111 and 112 respectively constitute first and second through-holes 111a and 112a piercing through the magnetic core 130, and the conductors 210 and 220 are disposed in the through-holes 111a and 112a, respectively. The through-holes 111a and 112a pierce through the magnetic member 110 from the surface 110c to the surface 110d.

The grooves 111 and 112 are bent at the midpoint. Thus, a gap between the grooves 111 and 112 becomes the maximum in the surfaces 110c and 110d that are an end portions, and the gap becomes narrower toward a central portion. The gap between the grooves 111 and 112 becomes zero in the central portion, and the grooves 111 and 112 are communicated through a cavity 113. In other words, a thickness T1 of a partition wall 114 that separates the grooves 111 and 112 is decreased toward the central portion, and the cavity 113 in which the partition wall 114 does not exist is formed in the central portion. Because the cavity 113 is filled with air, the cavity 113 acts as a nonmagnetic portion. The partition wall 114 constitutes a part of the magnetic member 110.

The planar shapes of the conductors 210 and 220 correspond to the planar shapes of the grooves 111 and 112. Therefore, when the conductors 210 and 220 are disposed in the grooves 111 and 112, a distance D1 between the conductors 210 and 220 through the cavity 113 is shorter than a distance D2 between the conductors 210 and 220 in the surfaces 110c and 110d of the magnetic member 110.

Grooves 115 to 118 are formed in the mounting surface 110a of the magnetic member 110. The grooves 115 to 118 accommodate leading end portions of the bent conductors 210 and 220 therein, respectively. That is, portions projected from the grooves 111 and 112 in the conductors 210 and 220 are bent in the surfaces 110c and 110d, and the leading ends of the portions are accommodated in the grooves 115 to 118.

Therefore, when the magnetic members 110 and 120 are bonded, the conductors 210 and 220 are exposed in the surfaces 110c and 110d and the mounting surface 110a. The exposed portions are used as terminal electrodes of the coil component 100. Positions 210a to 210d at which the conductor 210 is bent and positions 220a to 220d at which the conductor 220 is bent are as shown in FIG. 4.

Sectional surfaces (sectional surfaces intersecting a longitudinal direction) of the conductors 210 and 220 are formed into quadrangular shapes in which a side parallel to the mounting surface 110a is longer than a side perpendicular to the mounting surface 110a. The quadrangular shape of the sectional surface enables an area of the terminal electrode to be sufficiently secured while facilitating the bending. Sectional surfaces (sectional surfaces intersecting a longitudinal direction) of the through-holes made by the grooves 111 and 112 are also formed into quadrangular shapes corresponding to the sectional surfaces of the conductors 210 and 220. Therefore, an unnecessary gap is hardly formed between the conductors 210 and 220 and the magnetic core 130, which allows reduction of the entire size of the coil component 100.

Figure 5:
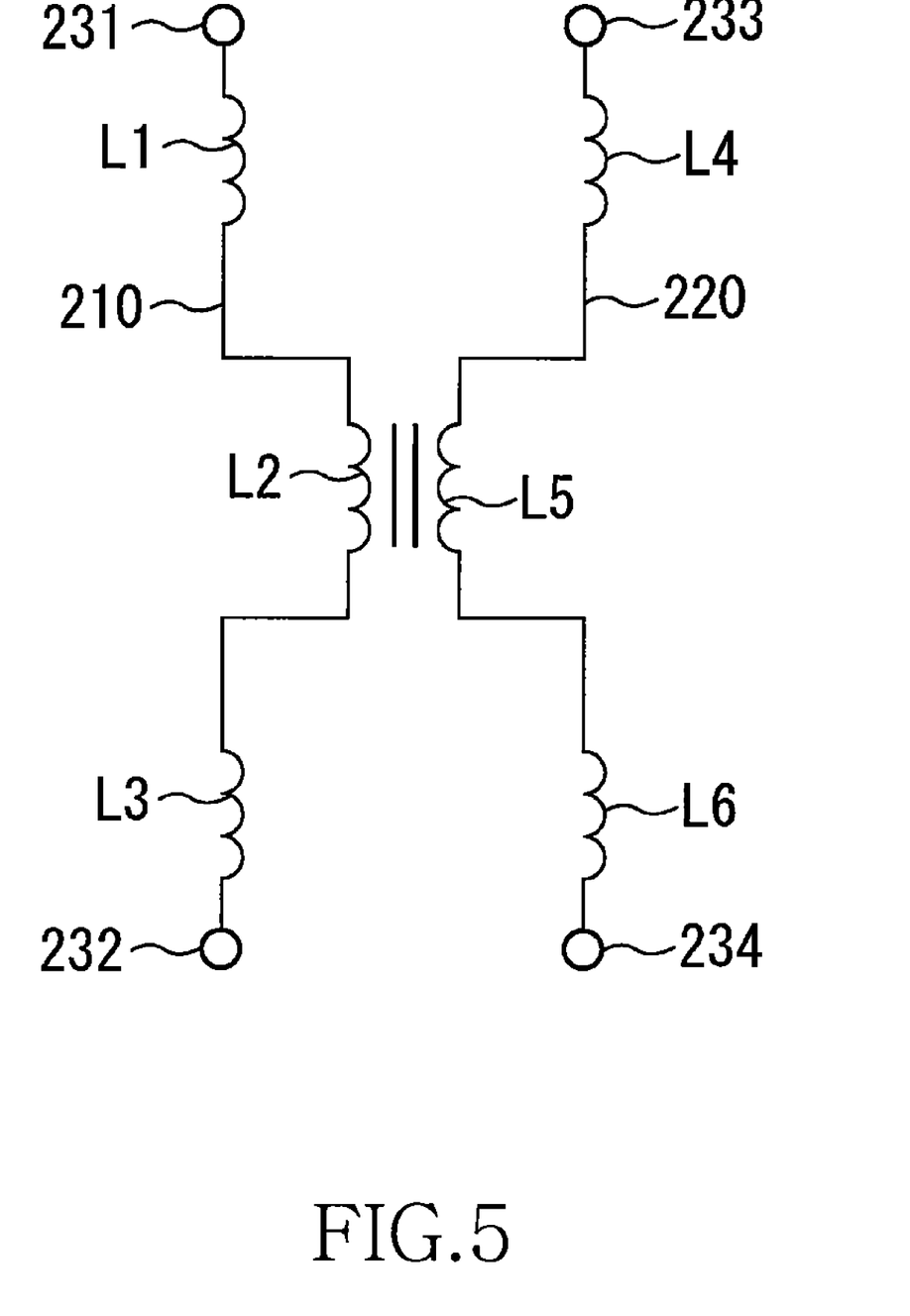
FIG. 5 illustrates an equivalent circuit of the coil component 100.

FIG. 5 illustrates an equivalent circuit of the coil component 100.

As illustrated in FIG. 5, in the circuit configuration of the coil component 100, inductors L1 to L3 are connected between a terminal electrode 231 that is one end of the conductor 210 and a terminal electrode 232 that is the other end of the conductor 210, and inductors L4 to L6 are connected between a terminal electrode 233 that is one end of the conductor 220 and a terminal electrode 234 that is the other end of the conductor 220. The relatively weak magnetic couplings are generated between the inductors L1 and L4 and between the inductors L3 and L6, because the inductors L1 and L4 and the inductors L3 and L6 are magnetically separated due to the presence of the partition wall 114. On the other hand, the partition wall 114 is not present between the inductors L2 and L5, and the inductors L2 and L5 come close to each other through the cavity 113 that is the nonmagnetic portion, and therefore the strong magnetic coupling is generated between the inductors L2 and L5.

As illustrated in FIG. 3, in the embodiment, lengths D3 from the end portions of the grooves 111 and 112 to the cavity 113 are the same when viewed from the side of the surface 110c and when viewed from the side of the surface 110d. Therefore, because the inductor L1 (L4) and the inductor L3 (L6) have the same inductance, the characteristic is not changed even if any one of the terminal electrodes 231 and 232 and the terminal electrodes 233 and 234 is used as the input side while the other is used as the output side. That is, because the coil component 100 has no directional property, the work efficiency can be enhanced when the coil component 100 is mounted. However, the invention is not limited to the coil component of the embodiment, but the coil component may have the directional property.

Figure 6:
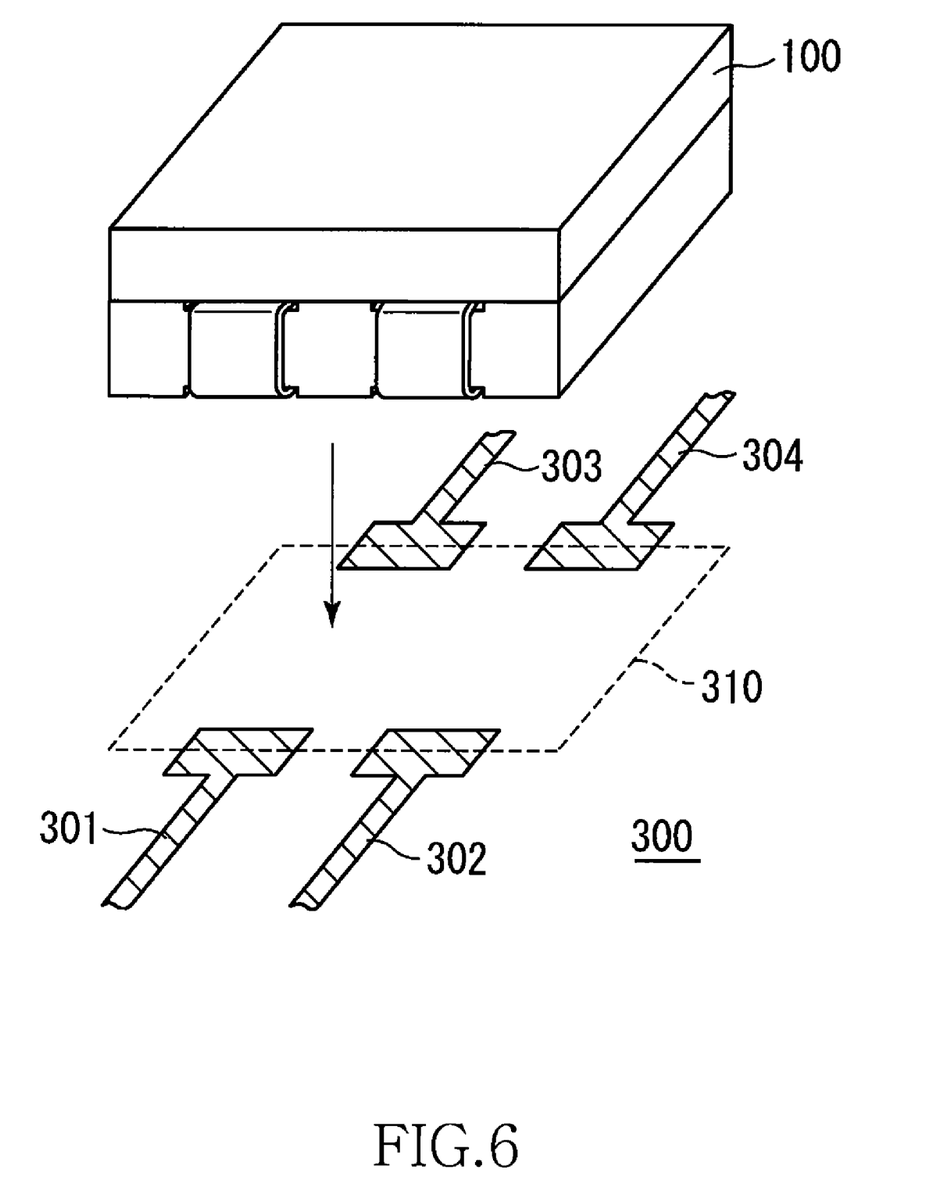
FIG. 6 illustrates a wiring pattern on a printed board on which the coil component 100 is mounted.

FIG. 6 illustrates a wiring pattern on a printed board on which the coil component 100 is mounted.

As illustrated in FIG. 6, a pair of input wiring patterns 301 and 302 and a pair of output wiring patterns 303 and 304 are provided in a printed board 300. The wiring patterns 301 to 304 are terminated at a mounting region 310, and the coil component 100 is mounted in the mounting region 310, thereby connecting the wiring patterns 301 to 304 to the corresponding terminal electrodes.

In this case, when the pair of terminal electrodes comes close to each other, it is difficult to correctly connect the wiring pattern and the corresponding terminal electrode, and a short circuit failure may be generated in some cases. On the other hand, in the coil component 100 of the embodiment, the distance between the conductors 210 and 220 is lengthened in the surfaces 110c and 110d in which the terminal electrodes are formed. Therefore, such problem does not occur, and high reliability can be secured.

As described above, in the coil component 100 of the embodiment, the distance between the conductors 210 and 220 is shortened in the cavity 113, so that the magnetic coupling between the conductors can be enhanced without providing the large cavity in the magnetic core 130. Further, the distance between the conductors 210 and 220 is lengthened in the surface of the magnetic core 130, so that the distance between the terminal electrodes adjacent to each other can sufficiently be secured.

A power-supply device in which the coil component 100 of the embodiment is used will be described below.

Figure 7:
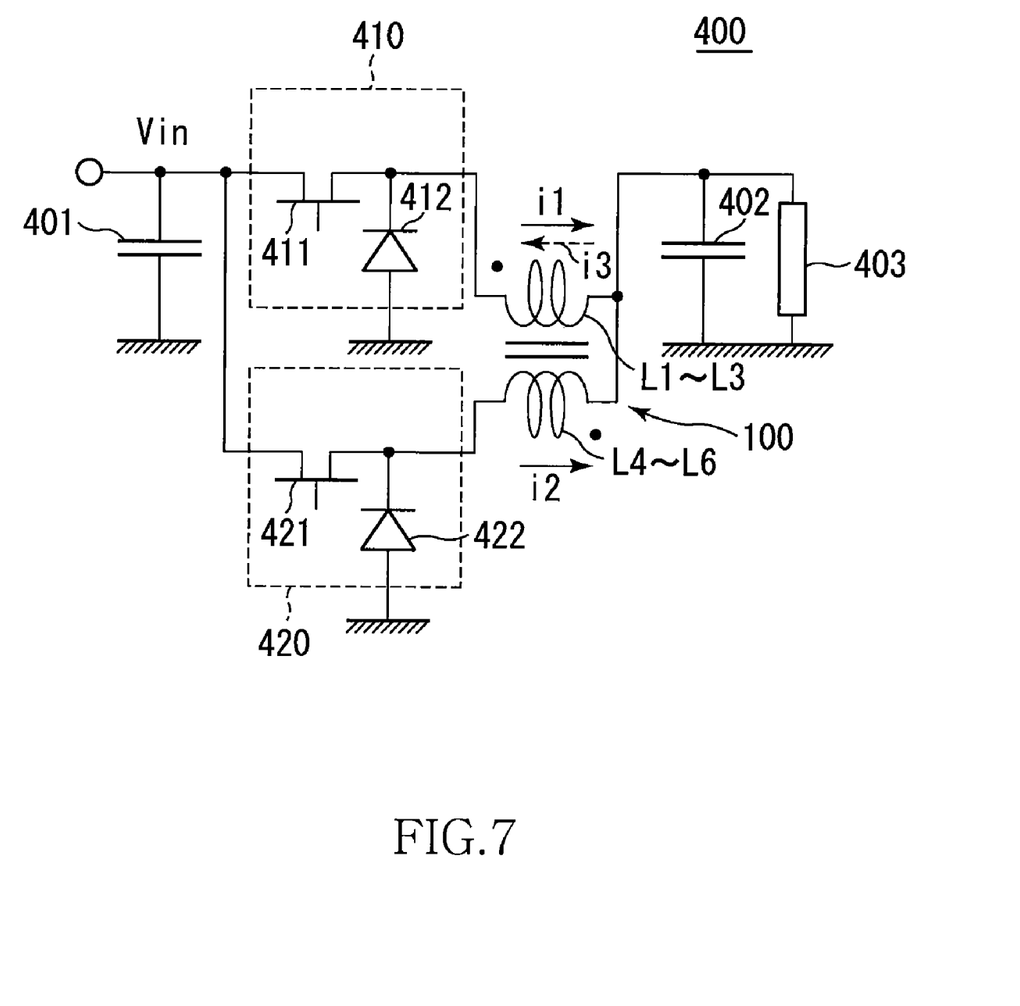
FIG. 7 is a circuit diagram illustrating a power-supply device 400 incorporating the coil component 100.

FIG. 7 is a circuit diagram illustrating a power-supply device 400 in which the coil component 100 of the embodiment is used.

The power-supply device 400 illustrated in FIG. 7 includes an input capacitor 401 that receives an input voltage Vin, a first switching unit 410 that produces a first switching current i1 from the input voltage Vin by switching, a second switching unit 420 that produces a second switching current i2 from the input voltage Vin by switching, the coil component 100 to which the switching currents i1 and i2 are supplied, and an output capacitor 402 that receives the switching currents i1 and i2 smoothed by the coil component 100. The output capacitor 402 is connected to a load 403.

The switching unit 410 includes a switching element 411 and a rectifier 412, and the switching unit 420 includes a switching element 421 and a rectifier 422. The switching elements 411 and 421 alternately perform an on-off operation to produce the switching currents i1 and i2 having different phases. The switching current i1 is supplied to the inductor L1 to L3 formed by the conductor 210, and the switching current i2 is supplied to the inductors L4 to L6 formed by the conductor 220.

Figure 8A:
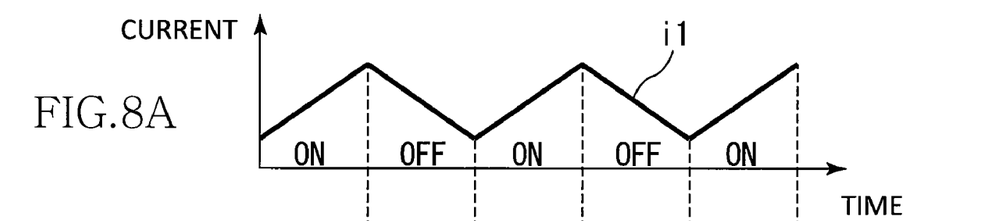
FIG. 8A illustrates a change in switching current i1.
Figure 8B:
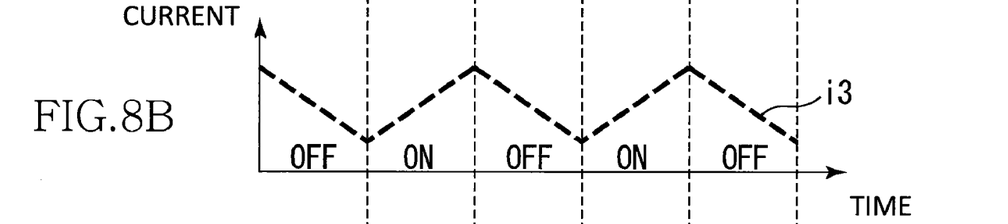
FIG. 8B illustrates a change in reverse current i3.
Figure 8C:
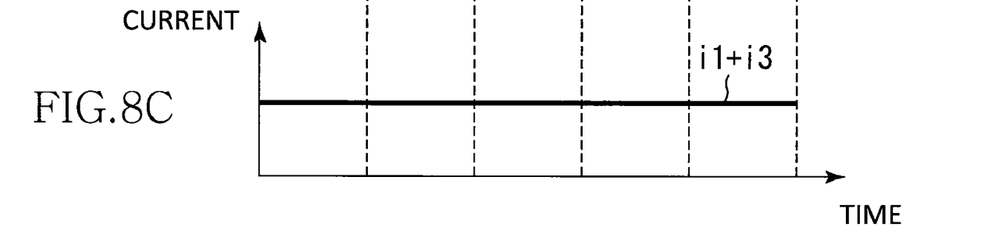
FIG. 8C illustrates a change in total current i1+i3.

FIGS. 8A to 8C show current waveform charts illustrating an operation of the power-supply device 400, FIG. 8A illustrates a switching current i1 passed through the inductor L1 to L3, FIG. 8B illustrates a reverse current i3 led to the inductor L1 to L3 by a switching current i2, and FIG. 8C illustrates a total current i1+i3 passed through the inductor L1 to L3.

The switching current i1 shown in FIG. 8A is produced by the switching operation of the switching unit 410, gradually increased in a period during which the switching element 411 is turned on, and gradually decreased in a period during which the switching element 411 is turned off. On the other hand, the reverse current i3 shown in FIG. 8B is produced by the switching operation of the switching unit 420, gradually increased in a period during which the switching element 421 is turned on, and gradually decreased in a period during which the switching element 421 is turned off. Because the switching elements 411 and 421 alternately perform the on-off operation, the total current i1+i3 shown in FIG. 8C is substantially kept constant. The description has been made by focusing on the current passed through the inductors L1 to L3. The same holds true for the current passed through the inductors L4 to L6.

It is apparent that the present invention is not limited to the above embodiments, but may be modified and changed without departing from the scope and spirit of the invention.

Figure 9:
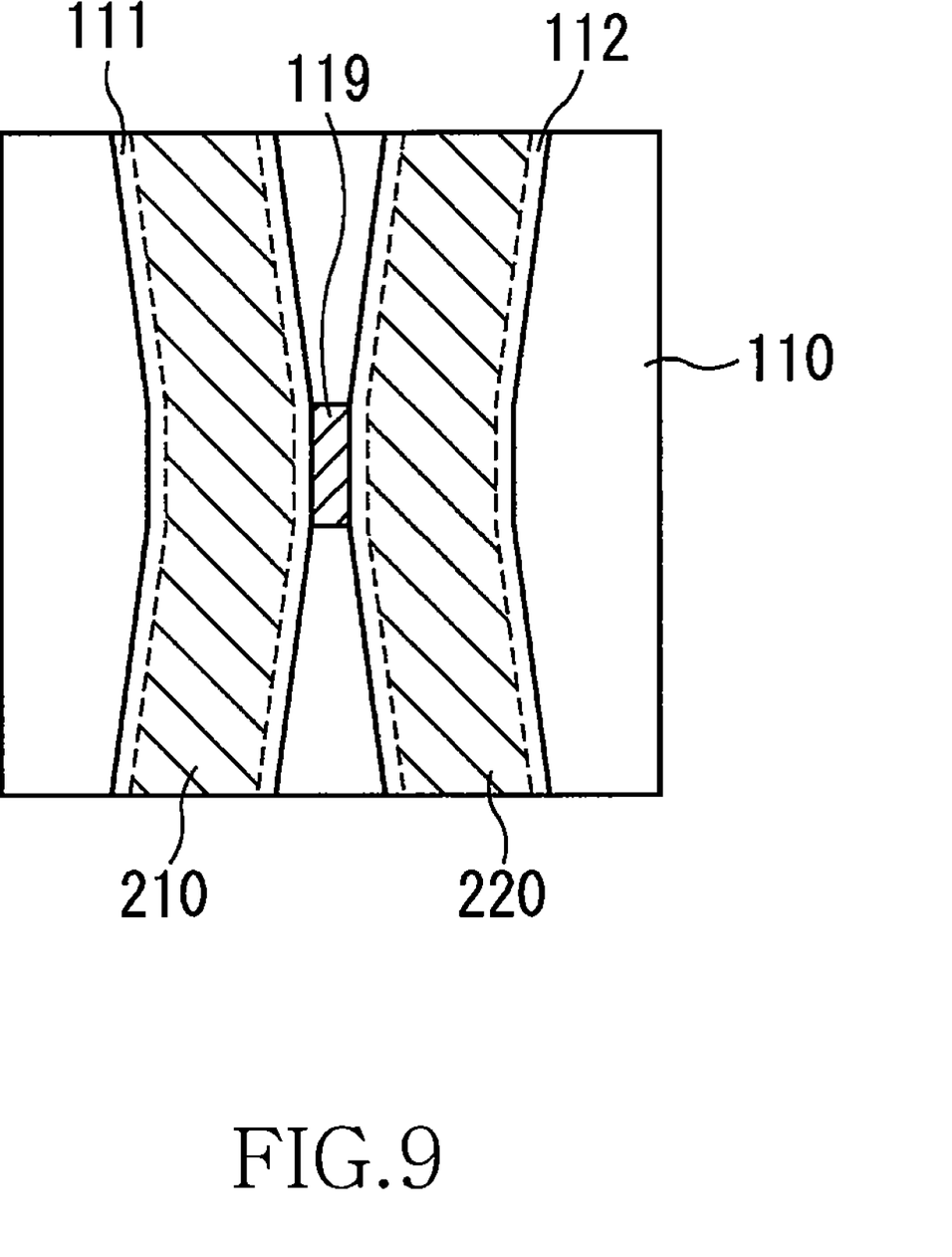
FIG. 9 is a schematic plan view illustrating an example in which an insulating member 119 is used instead of a cavity 113.

For example, in the embodiment, the cavity 113 constitutes the nonmagnetic portion in which the conductors 210 and 220 come close to each other. However, it is not always necessary that the nonmagnetic portion be formed by the cavity. Thus, as illustrated in FIG. 9, an insulating member 119 may be interposed instead of the cavity. Therefore, although the number of components is increased as compared with the use of the cavity 113, the short circuit failure through the nonmagnetic portion can be prevented. For example, nonmagnetic ceramic or a bonding agent (for example, thermo-setting epoxy resin) may be used as the insulating member 119.

In the embodiment, the groove is not provided in the second magnetic member 120 while the grooves 111 and 112 are provided in the first magnetic member 110. However, in the invention, the configuration of the magnetic core is not limited to the embodiment. For example, the grooves may be provided in both the magnetic members 110 and 120.

It is not always necessary that the magnetic core is formed by bonding the two magnetic members, but the magnetic core may be formed by bonding three or more magnetic members or the magnetic core may integrally be formed using a metallic powder compacting material. When the magnetic core is made of the metallic powder compacting material, volume efficiency can be enhanced because the gap is not generated between the conductor and the magnetic core. However, the cavity 113 is hardly formed in the magnetic core when the magnetic core is made of the metallic powder compacting material. Therefore, as illustrated in FIG. 9, desirably the nonmagnetic portion is formed by the insulating member 119.

Figure 10:
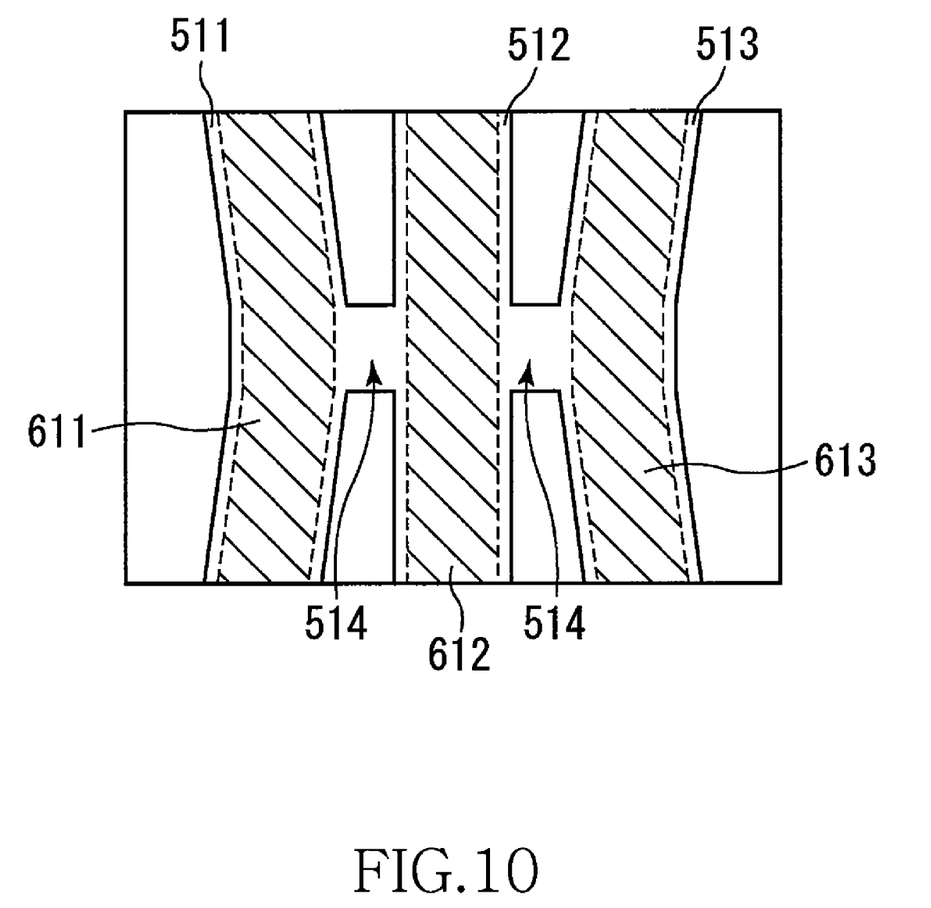
FIG. 10 is a schematic plan view illustrating an example in which three grooves 511 to 513 are provided in a magnetic core.

In the embodiment, the conductors 210 and 220 are disposed in the two grooves 111 and 112, respectively. Alternatively, as illustrated in FIG. 10, conductors 611 to 613 may be disposed in three grooves 511 to 513, respectively. In the shape illustrated in FIG. 10, the adjacent grooves (grooves 511 and 512 and grooves 512 and 513) come close to each other in the central portion, and the grooves are separated away from each other in the end portion. The adjacent grooves are communicated through a cavity 514 in the central portion.

Figure 11:
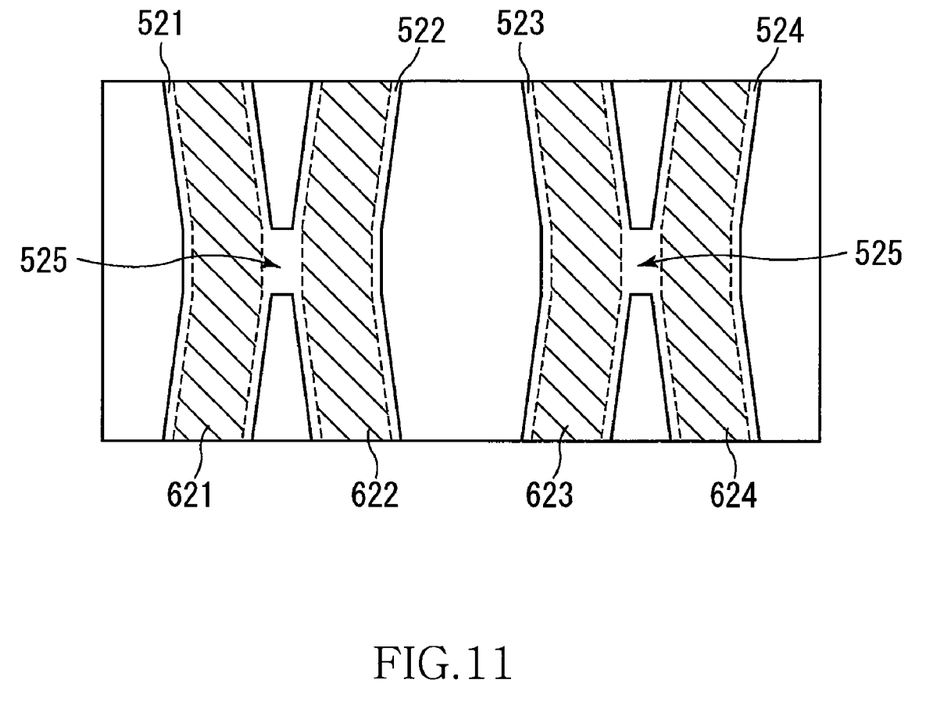
FIG. 11 is a schematic plan view illustrating an example in which four grooves 521 to 524 are provided in the magnetic core.

When three or more conductors are disposed, it is not always necessary that the all the adjacent conductors come close to one another in the central portion. For example, as illustrated in FIG. 11, in four grooves 521 to 524, the grooves 522 and 523 do not come close to each other in the central portion, and therefore the conductors disposed in the grooves 522 and 523 do not come close to each other in the central portion. In the example illustrated in FIG. 11, conductors 621 to 624 are respectively disposed in the grooves 521 to 524, the grooves 521 and 522 are communicated through a cavity 525 in the central portion, and the grooves 523 and 524 are also communicated through a cavity 525 in the central portion.

What is claimed is:

1. A coil component comprising:
   a magnetic core including at least first and second through-holes, the first and second through-holes piercing through the magnetic core from a first surface to a second surface; and
   first and second conductors that are disposed in the first and second through-holes without crossing to each other, respectively, wherein
   the magnetic core includes between the first and second through-holes a magnetic material portion and a nonmagnetic portion, the nonmagnetic portion communicating with the first through-hole and the second through-hole inside the magnetic core, and
   a distance between the first conductor and the second conductor through the nonmagnetic portion is shorter than a distance between the first conductor and the second conductor through the magnetic material portion.

2. The coil component as claimed in claim 1, wherein a length of the first and second through-holes from the first surface to the nonmagnetic portion is substantially equal to a length of the first and second through-holes from the second surface to the nonmagnetic portion.

3. The coil component as claimed in claim 1, wherein the nonmagnetic portion is a cavity.

4. The coil component as claimed in claim 1, wherein the nonmagnetic portion is an insulating member buried in the magnetic core.

5. The coil component as claimed in claim 1, wherein both ends of the first and second conductors are exposed while bent in the first and second surfaces of the magnetic core.

6. The coil component as claimed in claim 5, wherein both sectional surfaces of the first and second through-holes and sectional surfaces of the first and second conductors are formed into quadrangular shapes in which a side parallel to a mounting surface is longer than a side perpendicular to the mounting surface.

7. A power-supply device comprising:
   first and second switching units that produce first and second switching currents having different phases, respectively; and
   a coil component,
   wherein the coil component comprises:
   a magnetic core including at least first and second through-holes, the first and second through-holes piercing through the magnetic core from a first surface to a second surface; and
   first and second conductors that are disposed in the first and second through-holes without crossing to each other, respectively, wherein
   the magnetic core includes between the first and second through holes a magnetic material portion and a nonmagnetic portion, the nonmagnetic portion communicating with the first through-hole and the second through-hole inside the magnetic core,
   a distance between the first conductor and the second conductor through the nonmagnetic portion is shorter than a distance between the first conductor and the second conductor through the magnetic material portion, and
   the first and second switching currents are supplied to the first and second conductor, respectively.

8. A coil component comprising:
   a magnetic core including at least first and second through-holes, the first and second through-holes piercing through the magnetic core from a first surface to a second surface; and
   first and second conductors that are disposed in the first and second through-holes, respectively, wherein
   the magnetic core includes between the first and second through holes a magnetic material portion and a nonmagnetic portion, the nonmagnetic portion communicating with the first through-hole and the second through-hole inside the magnetic core, and
   a distance between the first through-hole and the second through-hole through the nonmagnetic portion is shorter than a distance between the first through-hole and the second through-hole through the magnetic material portion.

9. The coil component as claimed in claim 8, wherein the distance between the first through-hole and the second through-hole is gradually wider from the nonmagnetic portion to the first and second surfaces.

10. The coil component as claimed in claim 8, wherein a distance between the first conductor and the second conductor through the nonmagnetic portion is shorter than a distance between the first conductor and the second conductor in the first and second surfaces.

11. The coil component as claimed in claim 10, wherein the distance between the first conductor and the second conductor is gradually wider from the nonmagnetic portion to the first and second surfaces.

12. The coil component as claimed in claim 8, wherein neither the first conductor nor the second conductor is disposed in the nonmagnetic portion.

13. The coil component as claimed in claim 8, wherein the first and second conductors are disposed in the first and second through-holes without crossing to each other, respectively.

14. The coil component as claimed in claim 8, wherein
the magnetic core further includes a third through-hole piercing through the magnetic core from the first surface to the second surface,
the coil component further comprises a third conductor that are disposed in the third through-hole,
the magnetic core further includes another nonmagnetic portion that communicates the first through-hole and the third through-hole inside the magnetic core, and
a distance between the first through-hole and the third through-hole through the another nonmagnetic portion is shorter than a distance between the first through-hole and the third through-hole in the first and second surfaces.

15. The coil component as claimed in claim 14, wherein a distance between the first conductor and the third conductor through the another nonmagnetic portion is shorter than a distance between the first conductor and the third conductor in the first and second surfaces.

* * * * *